April 2, 1957 R. L. BROWN ET AL 2,787,493
FASTENER FOR TRIM MATERIAL
Filed June 20, 1952
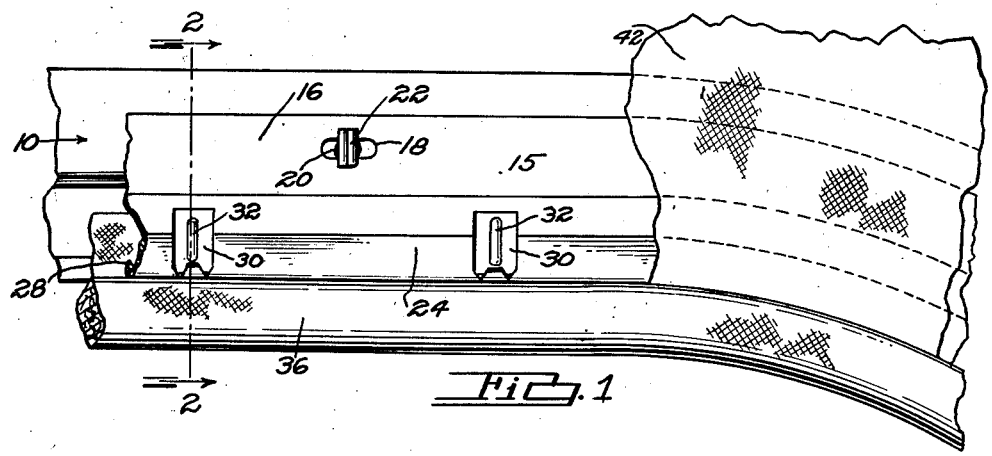
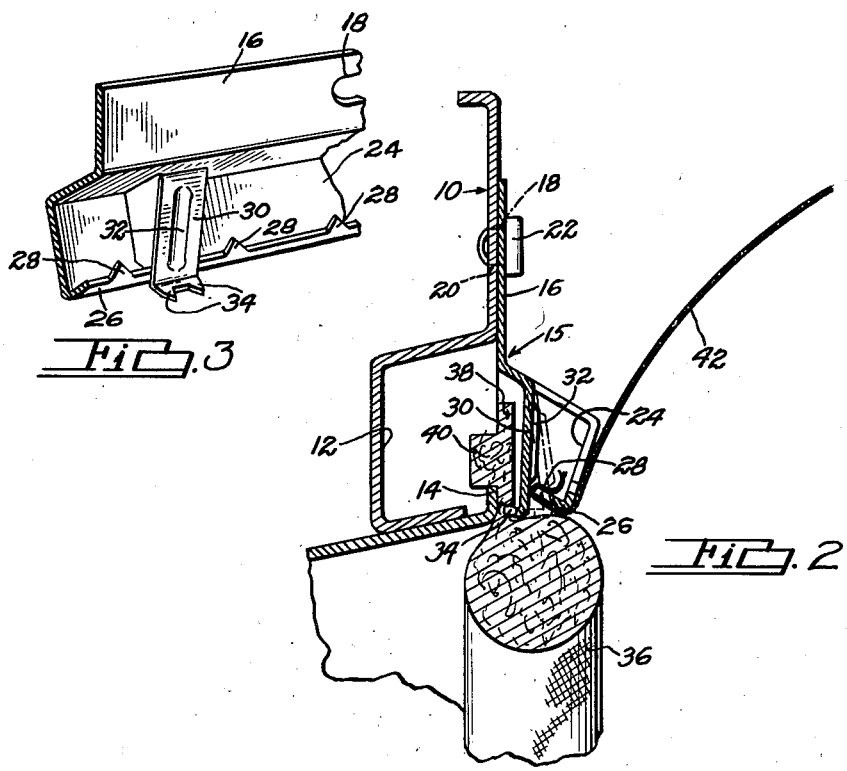
INVENTORS.
ROBERT L. BROWN AND
ROY E. PECKHAM
BY
THEIR ATTORNEY

United States Patent Office 2,787,493
Patented Apr. 2, 1957

2,787,493

FASTENER FOR TRIM MATERIAL

Robert L. Brown, Ferndale, and Roy E. Peckham, Detroit, Mich.; said Peckham assignor to said Brown, Ferndale, Mich.

Application June 20, 1952, Serial No. 294,758

1 Claim. (Cl. 296—28)

This invention relates to a means for retaining trim material to a body and is illustrated as embodied in a retainer for the headlining and wind cord of an automobile body.

Heretofore tacking strips have been applied to metal parts of the automobile body and the wind cord has been applied by tacking a flange of the wind cord to the tacking strip. A head lining retainer has then been applied to the metal body part for covering the flange of the wind cord and for retaining the headlining.

It is an object of the present invention to provide a one piece retainer for both the wind cord and the headlining and one in which the retainer may be applied in fixed position to the metal body part after which, and after body painting, the headlining and wind cord may be applied.

Another object of the invention is to provide a deformable tab, struck out of the body of the retainer, which may be bent into permanent holding position for retaining the wind cord after assembly.

Other objects and advantages of the invention will more fully appear from the following description taken in connection with the accompanying drawings, in which:

Fig. 1 is a fragmentary side elevational view of a portion of an automobile body at the intersection of the roof and the door opening, parts being broken away;

Fig. 2 is a cross sectional view taken on line 2—2 of Fig. 1; and

Fig. 3 is a fragmentary perspective view showing the inside of the retainer with one of the deformable tabs.

Referring to the drawings, an automobile body frame 10, which forms the roof rail, is provided with a channel portion 12 and a lower ledge 14 for receiving a tacking strip, heretofore used but not shown. However, this same channel and ledge may be used for receiving a modified form of wind cord, eliminating the use of a tacking strip.

The improved retaining strip 15 is provided with a flange 16 having slots 18 registering, when assembled to the body frame, with openings 20 in the body frame 10. A rivet or other fastening device 22 is received in the slot and opening for securing the retainer 15 to the frame 10. The retainer strip 15 is further provided with an offset channel portion 24 having a lower flange 26. This flange 26 has its outer free edge provided with a plurality of longitudinally spaced sharp pointed teeth 28.

Struck out of the body portion of the retainer strip 15 are tabs 30, which in their normal position extend between a pair of adjacent teeth 28 and adjacent the front edge of the flange 26, as shown by the dot and dash lines in Fig. 2. These tabs 30 have depressed ribs 32 for stiffening the tab. The end of the tabs 30 are bent at an angle to the body of the rib and are formed with sharp pointed teeth projections 34, extending in the same direction as the teeth 28 on the flange 26.

The wind cord has an annular body portion 36 which in normal position extends outwardly beyond the body frame 10 and has a flange portion 38 provided with an enlarged portion 40. The flange 38 and annular body 36 are preferably made of soft material such as rubber or other pliable material covered with a fabric material. The flange 38 and enlarged portion 40 are adapted to be easily inserted between the inner face of the body frame 10 and the retainer 15. The enlarged portion 40 is fitted over the ledge 14 and the tabs 30 are bent inwardly with the sharp teeth 34 piercing the flange 38 and holding the enlarged portion 40 on the ledge 14, as shown by the full line position of the tab in Fig. 2. Thus, the wind cord is held in fixed relation to the body frame 10.

The headlining 42, which is a fabric material, is then assembled by tucking the edge thereof around the pointed teeth 28 and between the teeth 28 and the deformed tab 30. The pointed teeth 28 hold the headlining position.

From the above it will be seen that there has been provided a retainer which may be assembled to the body frame before painting and before applying the upholstery or trim. The retainer has two distinct holding portions, one for the wind cord and the other for the headlining. Each may be applied separately. The assembly does not require the use of tacks or other separate holding means and may be assembled by unskilled labor.

It will be understood that various changes including the size, shape, and arrangement of parts may be made without departing from the spirit of the invention and it is not intended to limit its scope other than by the terms of the appended claim.

I claim:

A retainer for assembling windlace and head lining to an automobile body frame structure comprising, a metallic body having a flange adapted to be secured to the frame structure, an offset channel portion having its lower edge flange provided with spaced teeth extending toward but spaced from said body frame, spaced tabs struck out of said channel portion having teeth extending toward but spaced from said body frame, whereby the windlace may be inserted between said body frame and the teeth of said tabs which are adapted to be later bent outwardly of said channel by driving the teeth of said tabs into holding engagement with the windlace, and the head lining later inserted between said tabs and the teeth carried by said edge flange of said channel.

References Cited in the file of this patent

UNITED STATES PATENTS

| 710,292 | Mudd | Sept. 30, 1902 |
| 1,540,394 | Hall | June 2, 1925 |
| 2,127,234 | Reiter | Aug. 16, 1938 |
| 2,599,303 | Ward | June 3, 1952 |
| 2,677,572 | Pickard | May 4, 1954 |

FOREIGN PATENTS

| 864,869 | France | Feb. 3, 1941 |

(Corresponding U. S. 2,260,115, Oct. 21, 1941)

| 541,917 | Great Britain | Dec. 17, 1941 |